Aug. 9, 1966 J. R. ROSA 3,265,935

MODULAR CHASSIS

Filed Aug. 30, 1963 2 Sheets-Sheet 1

INVENTOR.
JOHN R. ROSA

BY Edward O. Ansell

ATTORNEY

MODULAR CHASSIS

Filed Aug. 30, 1963 2 Sheets-Sheet 2

INVENTOR.
JOHN R. ROSA
BY Edward O. Ansell
ATTORNEY

United States Patent Office
3,265,935
Patented August 9, 1966

3,265,935

MODULAR CHASSIS

John R. Rosa, Danville, Calif., assignor, by mesne assignments, to Aerojet-General Corporation, El Monte, Calif., a corporation of Ohio Filed Aug. 30, 1963, Ser. No. 305,741
8 Claims. (Cl. 317—101)

This invention relates to chassis generally, and more particularly to a modular chassis adapted to mount an assemblage of parts.

The mounting of electrical part and instrumentation into integral units such as receiving sets, transmitting sets, power supplies, solid state electronic controls, amplifiers, and similar electrical or electronic devices requires a suitable frame or support structure to position and enclose the various parts. These frames, chassis, or packaging systems have taken various configurations, all of which however, have been rather fixed and restrictive in size, design, and application. To achieve any degree of flexibility in the mounting of parts, a large number of constituent chassis components must be provided, each of which is normally fabricated by the forming of sheet metal material.

Therefore, the principal object of the present invention is to provide a novel and improved chassis for the mounting of an assemblage of parts.

Another object of this invention is to provide a chassis which provides increased flexibility in the mounting of parts.

Still another object of the invention is to provide a chassis which is modular in nature, using a minimum of components.

Yet another object of the invention is to provide a chassis which substantially eliminates the forming of sheet metal components thereto.

In its principal aspect, the present invention comprises two basic side plates of extruded material with grooves or slots at the top and bottom respectively, and an equal number of ribs which run the full length of the side surface of the plates. Modular height is derived by the use of a shaped spacer strip for insertion into the side plate grooves or slots. Flat mounting plates supported on the ribs, extend between the side plates. End plates together with top and bottom cover plates may also be provided to complete the chassis.

These and other objects, advantages, and features of this invention will be apparent to those skilled in the art from the following description taken together with the appended drawings wherein.

Figure 1:
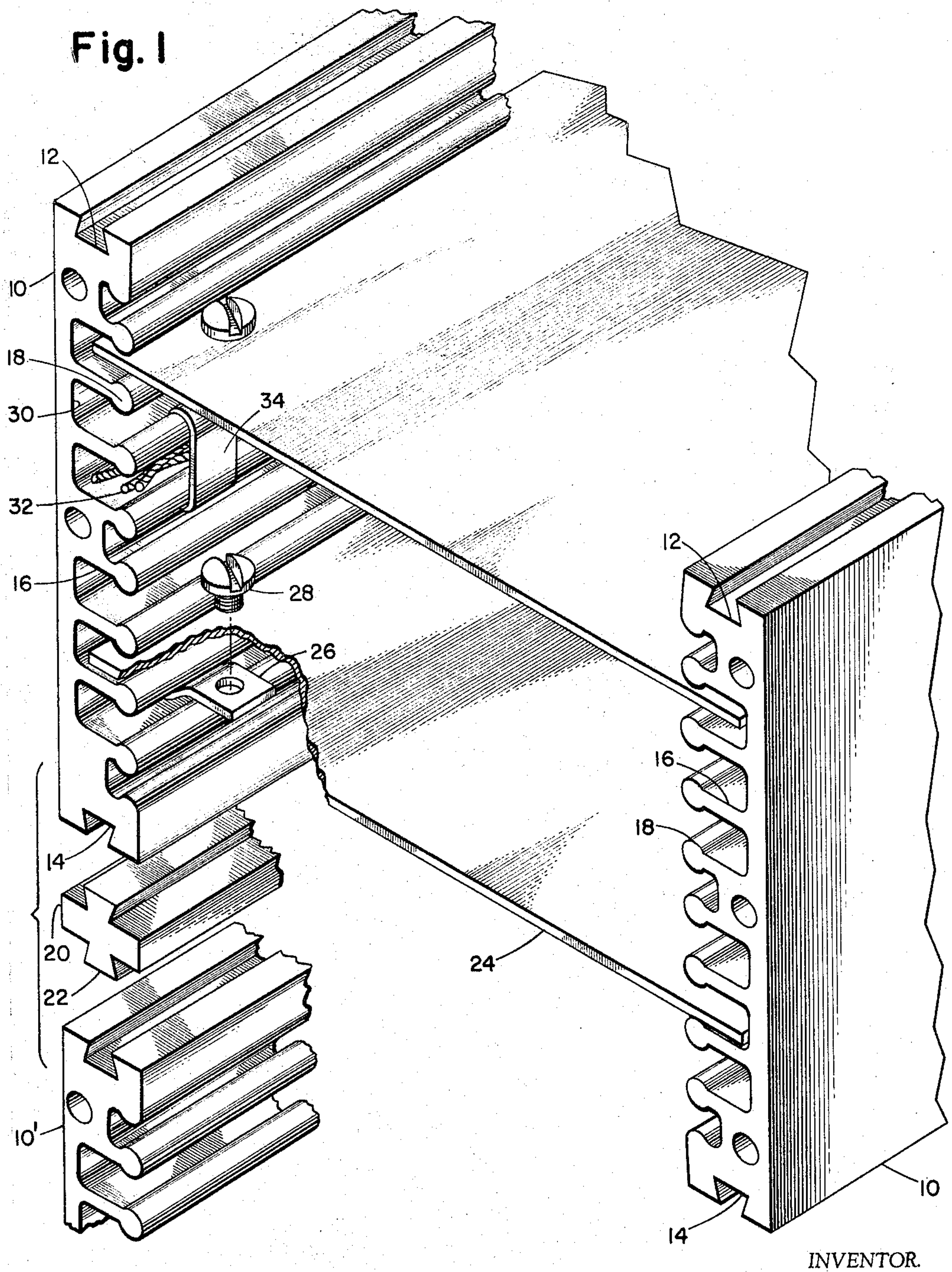
FIGURE 1 is an isometric view of the modular chassis assembly.

The modular chassis assembly is illustrated in FIGURE 1. The basic component of this assembly is the side plate, 10. The chassis assembly includes a pair or pairs of these plates, 10, which are extruded from a material such as aluminum. The extruded plates, 10, are then cut to length for a specific chassis.

At the top and bottom surfaces of each side plate, 10, there are grooves or slots, 12 and 14, respectively, which extend the full length of the plate, 10. The slots, 12 and 14, are shown as dovetailed for the purpose of illustration. On at least one lateral side surface of the side plate, 10, there is a plurality of fingers or ribs, 16, which likewise extend the full length of the plate, 10. The ribs, 16, may be provided with knobs, 18, at the ends thereof.

Extending between a pair of side plates, 10, are component mounting plates, 24. These flat sheet metal plates, 24, are placed upon the knobs, 18, of the ribs, 16, and held in position by means of clamps, 26, and screws, 28. These mounting plates, 24, can be of any reasonable width and the same length as the side plates, 10. The plates, 24, do not require any forming or fabrication beyond a sheet metal cutting operation.

The space between adjacent ribs, 16, of the side plate, 10, can be used as a wire trough, 30. The wires, 32, are held in place by means of a clip, 34.

Modular height of the chassis is derived by the use of a spacer strip, 20, having dovetailed sections, 22, which correspond to the dovetailed slots, 12 and 14, of the side plate, 10. The spacer strip can likewise be of extruded aluminum. An additional pair of side plates, 10', can be mounted either on top of or below the original pair of side plates, 10. By providing two separate heights of side plate, e.g., 3½ inches and 5¼ inches, a countless number of useful chassis heights can be obtained, specifically 3½, 5¼, 7, 8¾, 10 ½, 12¼, 14, 15¾, etc.

Figure 2:
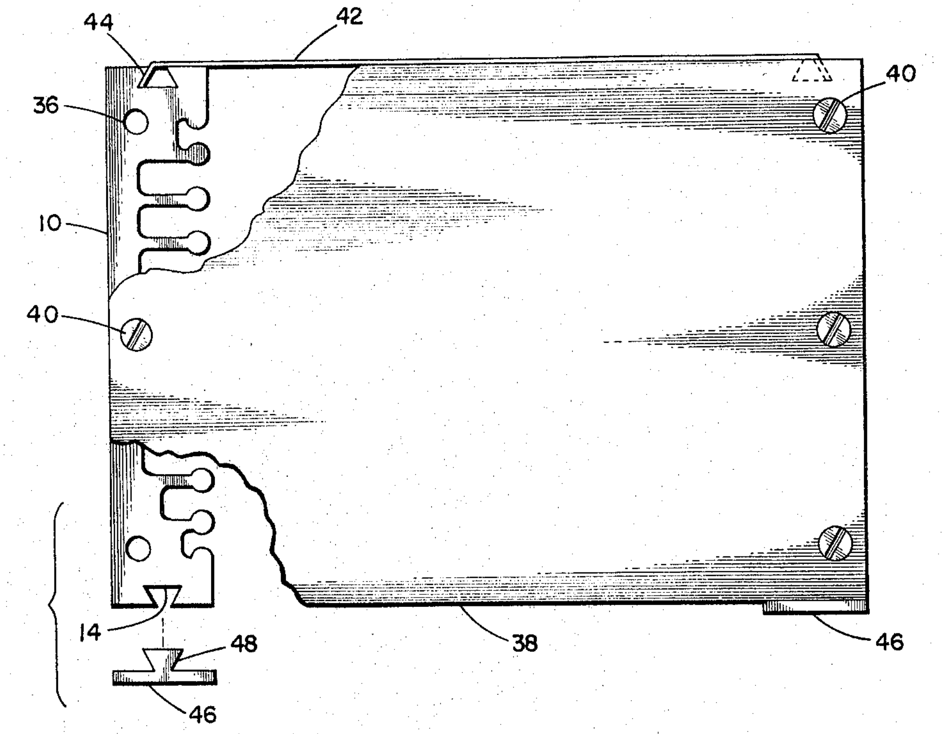
FIGURE 2 is a partially cutaway view of the front of an enclosed modular chassis assembly.

The chassis is preferably enclosed to prevent dust and other foreign objects from collecting on the components. FIGURE 2 illustrates an enclosed chassis. Holes 36, which can, if desired, extend the length of the extruded side plate, 10, provide for the fastening of an end plate, 38, by means of self-tapping screws, 40. Both ends of the chassis may be so enclosed. At top cover, 42, with a projecting appendage, 44, to engage the dovetailed slots, 12, of the side plate, 10, is provided. A similar cover can be provided for the bottom of the chassis. Alternately, rubber mounting feet, 46, with a dovetailed section, 48, to engage the bottom dovetailed slots, 14, of the side plate, 10, can be provided.

Figure 3:
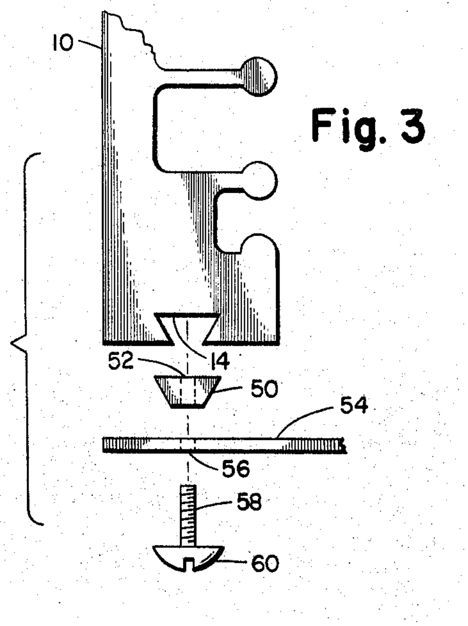
FIGURE 3 shows an alternate means of enclosing the chassis.

An alternate means of enclosing the chassis is shown in FIGURE 3. A tapered filler strip, 50, provided with holes, 52, is adapted to fit into the slots, 14, of the side plate, 10. A cover plate, 54, with holes, 56, is then fastened to the side plate, 10, by means of a screw, 58. For the bottom of the chassis the screw, 58, may have a rubber head, 60. The same filler strip can be used to attach a cover plate to the top of the chassis.

The chassis, as described above, is modular in height, width, and length. The basic side plates can be extruded to any length and cut into the desired size as needed. The mounting plates, end plates, and covers are all of sheet metal and do not require any forming other than cutting to size. The basic components are few in number and can be reused. This chassis is of particular advantage in prototype development work where changes can be made with a minimum of effort and expense. It is also adaptable to nearly all types of electronic applications. Changes can be made with a minimum of effort and expense.

While preferred forms of the invention have been shown and described, it will be apparent to those skilled in the art, that modification can be made to these forms without departing from the principles and spirit of the invention, the scope of which is defined in the appended claims.

What is claimed is:

1. A modular chassis comprising: a plurality of pairs of side plate members, said side plate members having upper and lower edge surfaces with keyed slots extending along the outside said edge surfaces and having a plurality of horizontal rib-like projections equally spaced on at least one side surface thereof, component mounting members extending between said pairs of side plate members, and separately removable key members associated with said side plate keyed slot joining stacked pairs of side plate members.

2. A modular chassis as described in claim 1, and in addition, end plate members fastened to the front and back surfaces of said side plate members.

3. A modular chassis as described in claim 2, and in addition, a cover plate associated with said side plate members and having projecting appendages to engage the keyed slots of the top pair of said side plate members to form an enclosure therewith.

4. A modular chassis as described in claim 2 and in addition associated with said side plate members a flat cover plate, and a pair of keyed filler strips associated with said side plate members, said keyed filler strips engaging the keyed slots of the top pair of side plate members to enable fastening of said flat cover plate to the top pair of side plate members.

5. A modular chassis comprising: a plurality of pairs of side plate members, said side plate members having upper and lower edge surfaces with dovetailed slots therein and having a plurality of ribs equally spaced on at least one side surface thereof, component mounting members extending between said pairs of side plate members, clamps associated with said component mounting members to fasten said component mounting members to the ribs of the side plate members, dovetailed key members associated with said side plate members to engage said dovetailed slots of said side plate members to join stacked pairs of side plate members, end plates fastened to the front and back surfaces of said side plate members, a flat cover plate associated with said side plate members, and a pair of dovetailed filler strips associated with said side plate members and said cover plate to engage the dovetailed slots of the top pair of said side plate members to enable fastening of said flat cover plate to the top pair of side plate members.

6. A modular chassis as described in claim 5 and in addition, mounting feet associated with said side plate members and having a dovetailed appendage to engage the dovetailed slots of the bottom pair of said plate members.

7. A modular chassis as described in claim 5, wherein the ribs of said side plate members have knobs at the ends thereof.

8. A modular chassis as described in claim 5, and in addition, clips associated with said side plate members to hold electrical wires in the space between adjacent ribs of said side plate members.

References Cited by the Examiner

UNITED STATES PATENTS

| | | | |
|---|---|---|---|
| 512,496 | 1/1894 | Autenrieth | 312—11 |
| 2,511,949 | 6/1950 | Simon | 312—111 X |
| 2,561,426 | 7/1951 | Stearn et al. | 317—99X |
| 3,010,052 | 11/1961 | Heath et al. | 317—101 |

FOREIGN PATENTS

| | | |
|---|---|---|
| 92,181 | 11/1961 | Denmark. |

ROBERT K. SCHAEFER, *Primary Examiner.*

KATHLEEN H. CLAFFY, *Examiner.*

M. GINSBERG, *Assistant Examiner.*